United States Patent Office 3,404,012
Patented Oct. 1, 1968

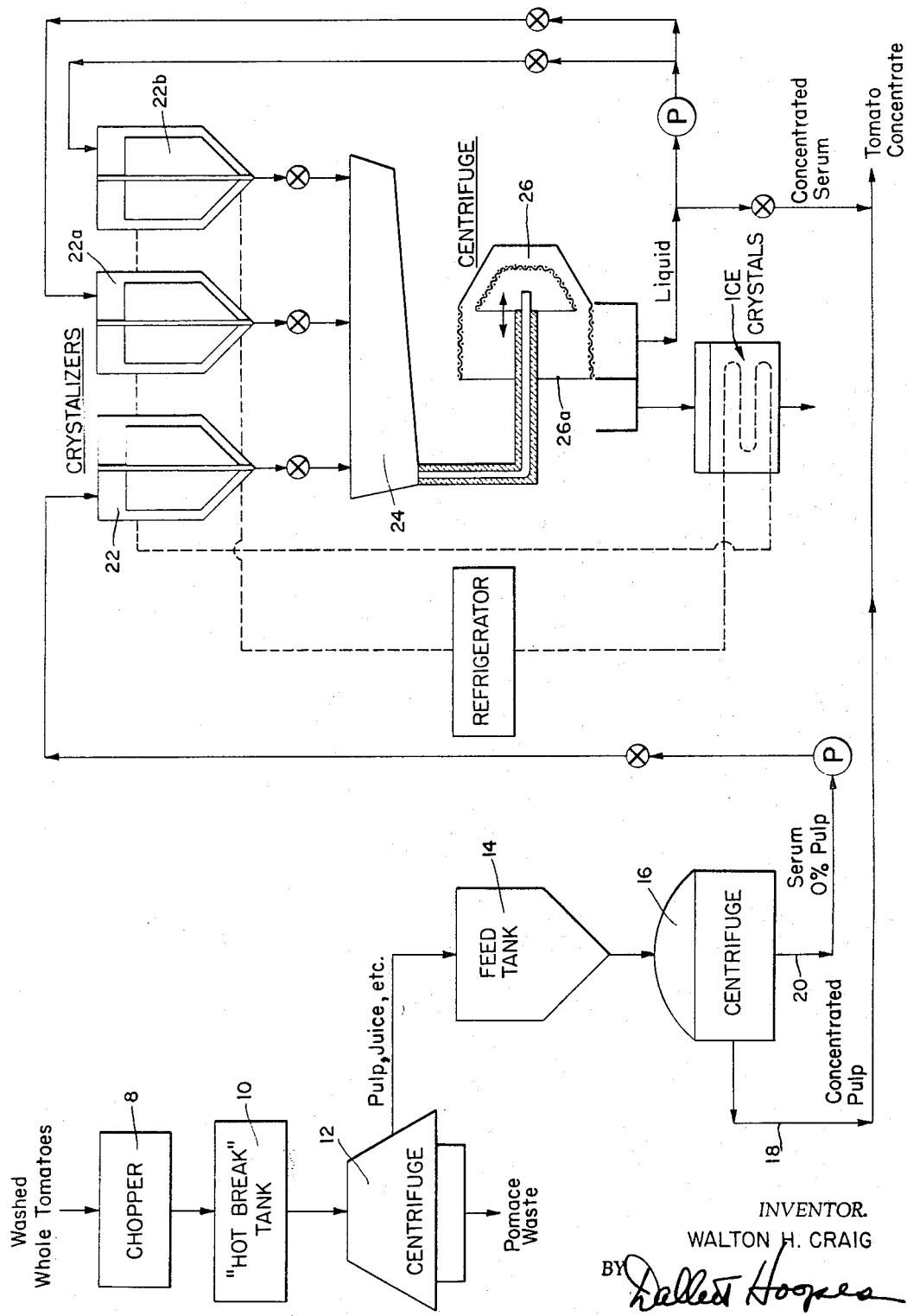

3,404,012
PROCESS OF PREPARING TOMATO
CONCENTRATE
Walton H. Craig, Winnetka, Ill., assignor to Pennsalt
Chemicals Corporation, a corporation of Pennsylvania
Filed June 25, 1963, Ser. No. 290,497
2 Claims. (Cl. 99—204)

ABSTRACT OF THE DISCLOSURE

In a tomato concentrate process, the step of freeze concentrating serum centrifugally separated from solids and derived from a heated mass of chopped tomatoes, thus forming ice crystals and serum concentrate, the latter being centrifugally separated from the ice crystals and recombined with the separated solids.

---

This invention relates to the processing of tomatoes and the like. More specifically, this invention relates to processing raw tomatoes to a concentrate which may serve as a stock to be used in the manufacture of various tomato products.

In the prior art the desirability of producing a tomato concentrate has been recognized. A primary advantage from such a concentrate accrues in its production at a location convenient to the farmland where tomatoes are grown, its relatively inexpensive shipment as compared with whole tomatoes to a point of further processing which may be located in a municipal area, for instance. Obviously by shipping the relatively lighter concentrate the tomato processor would be able to make substantial transportation savings and other savings associated with storage at transportation terminals, etc.

Many attempts have been made in the past to produce from raw tomatoes a tomato concentrate which when reconstituted by the processor or by the consumer produced a product in appearance and taste and other qualities similar to the product as produced without the concentration and subsequent dilution. One such attempt to produce a concentrate has involved the production of a tomato juice by carefully screening chopped tomato particles and by subsequently evaporating the juice to drive off a majority of the water content. This process has produced a concentrate with little soluble and insoluble solids loss. Unfortunately, however, the evaporation accomplished on the viscous mass under a partial vacuum at a temperature of between 150° F. and above, has given the product when subsequently diluted for use a "burnt" taste due to long contact with hot wall surfaces. It is assumed that the burnt taste is attributable to the evaporation temperatures, temperatures which are for practical purposes unavoidable due to the great expense involved in evaporating at the lower pressures required at lower temperatures. Moreover, the production of a tomato concentrate by evaporation at practical temperatures has resulted in the degradation of pectin resulting in a loss of desirable body through the product. Vitamin matter and volatile aromatic particles have likewise been destroyed.

Another attempt to produce a tomato concentrate has involved chilling the tomato juice to a temperature in which crystals of ice have appeared in the liquid. Subsequently the ice crystals have been separated from the tomato liquid by centrifugal apparatus such as a basket centrifuge. The ice crystals have been discarded and the concentrated tomato juice has been further concentrated in a second stage of freeze concentration to produce the concentrate. Unfortunately the product produced in this manner has been unnecessarily robbed of much of the insoluble solid matter. This solid matter including fibers and color bodies has during the freeze process become entrained or occluded in the ice crystals in the separation step and has been discarded with the crystals. The concentrated product has therefore suffered in quality as well as in quantity.

Other features and benefits of the invention will be apparent from an inspection of the accompanying sheet of drawings and the following description in connection with the drawings which constitutes a simplified flow sheet for a process embodying the invention.

Briefly, in the preparation of a vegetable product, the invention involves the division of vegetable matter into a solids portion and a clear serum portion, freeze concentrating the serum portion and combining the concentrated serum portion with the solids portion.

According to a process embodying my invention as shown in the figure, washed whole tomatoes are presented to a chopper 8 in which the tomatoes are reduced to a size no larger than ½ inch.

As is well known in the art, cells of the vegetable are broken during the chopping process, liberating certain enzymes. In order to avoid the enzyme degradation of the valuable pectin in the tomato pulp, from the chopper the tomatoes are delivered as rapidly as possible to a "hot break" tank or cooker 10 in which the pulp is heated to a temperature ranging between about 170° F. and 205° F. and held at that temperature for a period of about 20 minutes to destroy the enzymes. As is well known, enzymes if allowed to flourish attack the pectin to deprive the finished product of its body. A "cold break" may be substituted as is well known in the art. Such a quick heat break while the material is thin does not produce the "burnt" taste that is noticeable in evaporation procedures in which surface contact of a relatively viscous mass has been relatively long.

From the cooker the chopped tomato pulp including skins, seeds, stems and a wide range of impurities is delivered to a screening device 12 which preferably is a centrifuge of the type comprising a perforate frusto-conical rotor with a feed inlet at the small end thereof and containing a screw conveyor driven at a slightly different speed than the rotor so that the flights on the conveyor urge the gradually deliquefying undesirable solids toward the discharge end. Such a centrifuge is available under the trademark "Conejector" centrifuge. Solids which pass out the larger end of the centrifugal solids dryer comprise the waste pomace which may be used after additional processing for fertilizer or animal food. The liquid and desirable small solids which pass through the perforations in the dryer rotor are delivered to a feed tank 14 wherein they may be gently agitated to produce as near as possible a homogeneous mass of screened whole pulp.

From the feed tank 14 the screened whole pulp is delivered to a centrifuge 16. The centrifuge is preferably of the clarifier bowl type comprising a solid bowl containing a central disc stack and of the type available under the trademark "Nozljector" centrifuge. The pulp is fed to the bowl from an axial feed tube. As is conventional the heavy solids discharge passes through peripheral nozzles spaced about the outer wall of the bowl. From the nozzles the solids discharge or concentrated tomato pulp is collected and delivered through the line 18. The light discharge comprising a clear serum having for practical purposes no insoluble solids content discharges over a ring dam centrally above the disc stack, is collected and is delivered through the line 20.

It will be understood that the serum contains sugars, color bodies, etc., but is approximately 90% water.

From the centrifuge 16 the serum may be pumped or otherwise conveyed to the first of a plurality of cystallizers 22. Each of the crystallizers may be conveniently comprised of a jacketed kettle having brine circulating through the kettle jacket to absorb heat from the serum through the inner wall of the jacket and to thereby lower the temperature in the first crystallizer 22 to a temperature below about 20° F. As is conventional the crystallizer features a rotating scraper which gently agitates the liquid and scrapes crystal structures from the wall of the crystallizer as these crystals gradually form there.

After a period of time depending on the temperature of the brine in the crystallizer jacket as well as on a number of other features, the dump valve at the drain of the crystallizer may be thrown open automatically or by manual means to discharge the mixture of concentrated serum and ice crystals into the collecting trough 24.

From the trough 24 the mixture of concentrated serum and crystals is conducted by an insulated tube to a centrifuge 26. In order not to damage or heat the crystals the centrifuge 26 is preferably of the "pusher" type comprising an outer perforate rotor and an inner frusto-conical perforate rotor which rotates with the outer rotor and reciprocates in relation to the outer rotor. This centrifuge gently drains and tangentially accelerates the crystals, pushing them towards the discharge open end 26a with a minimum of abrasion.

More complete disclosure of a centrifuge suitable for use as a centrifuge 26 may be found in the U.S. patent application Ser. No. 145,811, filed Oct. 18, 1961, by Fred P. Gooch, now Patent No. 3,136,722, issued June 9, 1964.

The ice crystals discharging at frequent intervals over the outer edge of centrifuge 26 are collected. The crystals may be held in a heat exchange container through which as shown the brine directed towards the jackets of the crystallizers is led.

The liquid concentrate passing through the perforations of centrifuge 26 is collected and may be pumped to a second freeze concentrating stage comprising the crystallizer 22a, the trough 24 and again the centrifuge 26. Virtually the same process as with crystallizer 22 is repeated using the crystallizer 22a, it being understood that in the meantime a new load of serum has been introduced into the crystallizer 22 and is undergoing the chilling process. The concentrated serum after becoming chilled to the point of formations of crystals in crystallizer 22a is drained into trough 24 for subsequent feeding to the centrifuge 26. After removal of the crystals the more concentrated serum may be sent through a third stage of freeze concentrating, this stage involving the third crystallizer 22b. Obviously additional stages of freeze concentration, each one involving the use of an additional crystallizer, may be used. It should be understood that the centrifuging operation accomplished by centrifuge 26 takes but a fraction of the time for the crystallizing process and hence the one centrifuge 26 may accomplish the crystal separation for the products of a plurality of crystallizers. Moreover, for a limited operation, the same crystallizer may be used for more than one stage in the concentrating process; that is, the same crystallizer may be used for the first and third stages, for instance, by a rearrangement of the piping as will be obvious to one skilled in the art.

The sequence of operations for the various valves at the drain openings of the crystallizers and the valves downstream from the pump in the liquid discharge centrifuge 26 will be obvious to one skilled in the art. Suffice it to say, the crystallizers are dumped serially and the concentrated liquid separated from the crystals in each dumping is pumped to the next adjacent crystallizer for subsequent additional concentration.

After the final stage of concentration the concentrated liquid or serum is conducted as shown in the drawings in a stream to recombine with the pulp concentrated in the centrifuge 16 and discharging from the centrifuge by means of line 18.

The tomato concentrate produced by a process embodying my invention is remarkable for its body and solids content. Testifying to this conclusion is the fact that the ice crystals separated from the concentrated serum by the centrifuge 26 are found to have entrained for practical purposes no insoluble solids. Moreover, after the rinsing which may be included as part of the centrifuging step soluble solids which may otherwise adhere to the surface of the ice crystals and discharge to waste with them are removed and have been notable for their absence in the ice crystals waste.

In addition, the tomato concentrate produced by a process embodying my invention has the taste of a natural tomato product, with no traces of "burnt" flavor. The product readily lends itself to use in the forming of any of the conventional tomato products, such as puree, paste, ketchup, chili sauce, tomato juice, etc.

It may be noted in the experimentation with apparatuses embodying the process according to my invention that the first stage freeze concentration roughly doubles in percentage the content of solids, but subsequent stages in steps of decreasing ratio contribute less and less to additional concentration. Hence, for example, if the serum introduced to the crystallizer 22 is roughly 8% solids, the concentrated serum introduced to crystallizer 22a will be approximately 16% solids. However, instead of in the subsequent step the percentage again doubling, feed introduced to the crystallizer 22b may be on the order of about 22% solids, etc. Hence, there is approached a point of diminishing returns and it has been found that for practical purposes about three stages of freeze concentration is optimum.

It should be understood that because the process was conceived and perfected in connection with the concentration of tomatoes it has been described in such application. However, as will be induced by one skilled in the art, the process according to the invention has use in the concentration of other vegetables and fruits, such as oranges, apricots, pears, pineapples, for instance.

It is, therefore, to be understood that the above particular description is by way of illustration and not of limitation, and that changes, omissions, additions, substitutions and/or other modifications may be made without departing from the spirit of the invention. Accordingly it is intended that the patent shall cover by suitable expression in the claims, the various features of patentable novelty that reside in the invention.

I claim:

1. The process of preparing a tomato concentrate including the steps of chopping to produce pulp, juice, and pomace, heating the chopped mass of pulp, juice and pomace to a temperature in the range of between approximately 170° F. and 205° F. for about 20 minutes in order to inactivate the enzymes therein, separating the pulp and juice from the pomace, withdrawing the pulp and juice to zone of centrifugation, discharging clear serum free from solids at a locus adjacent the axis of the zone and permitting discharge of solids separately from adjacent the periphery of the zone, introducing the serum to a chilling region and forming ice crystals therein, feeding the mixture of serum and ice crystals to a second zone of centrifugation defined by a perforate peripheral surface, withdrawing the clear serum concentrated and separate from the crystals through the perforations in the surface and recombining the thus concentrated clear serum with the solids from the first zone of centrifugation.

2. The process of claim 1 wherein the concentrated serum after being withdrawn from the second zone of centrifgugation is delivered to a second chilling region and forming ice crystals therein and delivering the mixture of concentrated serum and ice crystals back to said second zone of centrifugation and withdrawing the concentrated serum reconcentrated and separate from the crystals.

References Cited

UNITED STATES PATENTS

| | | | |
|---|---|---|---|
| 2,115,815 | 5/1938 | Johnson | 99—204 |
| 2,559,205 | 7/1951 | Wenzelberger | 99—206 X |
| 3,146,198 | 8/1964 | Keith | 99—204 X |
| 2,959,486 | 11/1960 | Strashun et al. | 99—204 |
| 3,023,111 | 2/1962 | Huber | 99—204 X |

HYMAN LORD, *Primary Examiner.*